Dec. 1, 1936.  H. S. JANDUS ET AL  2,062,315
VEHICLE BUMPER CONSTRUCTION
Filed June 11, 1934   2 Sheets-Sheet 1
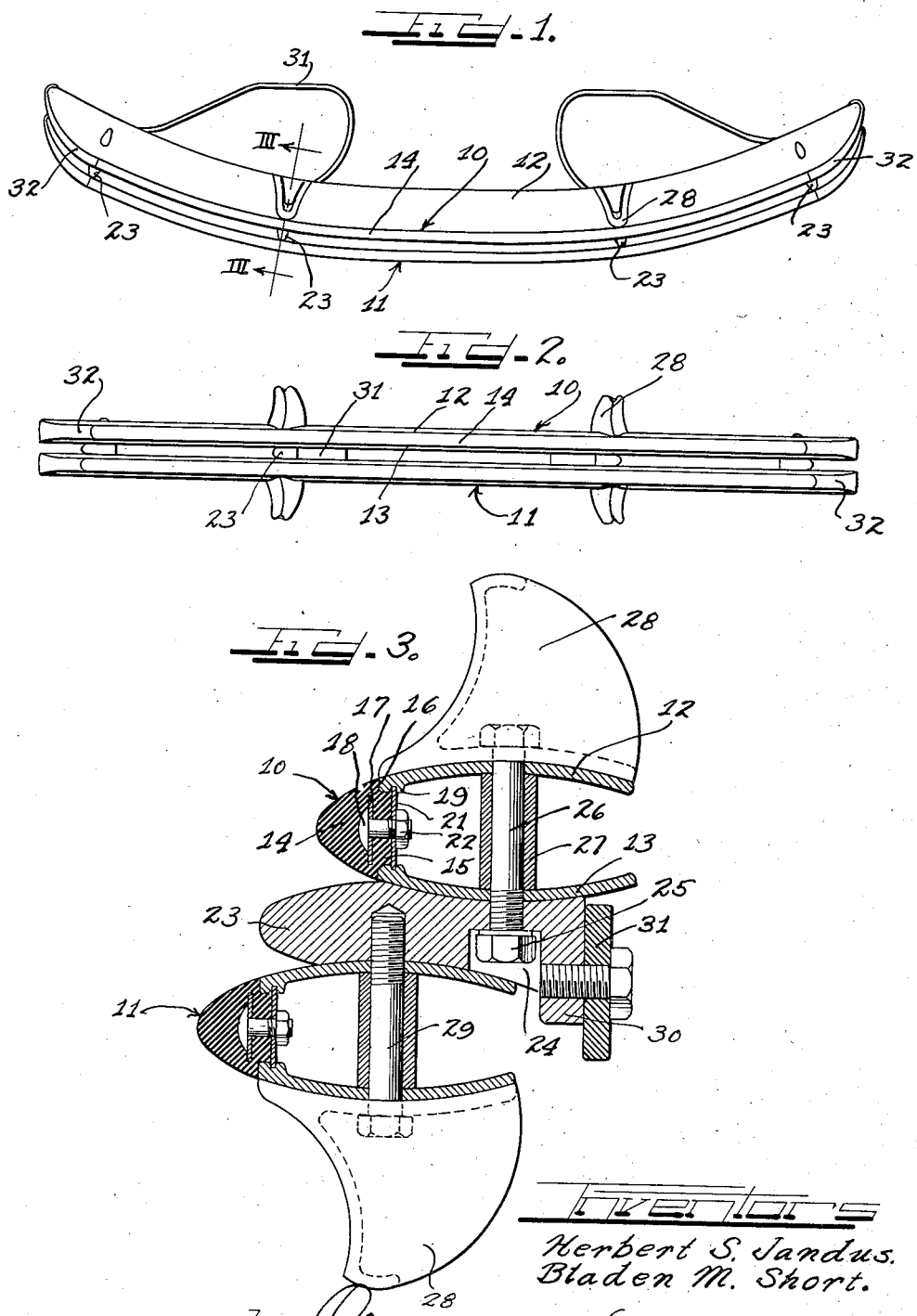

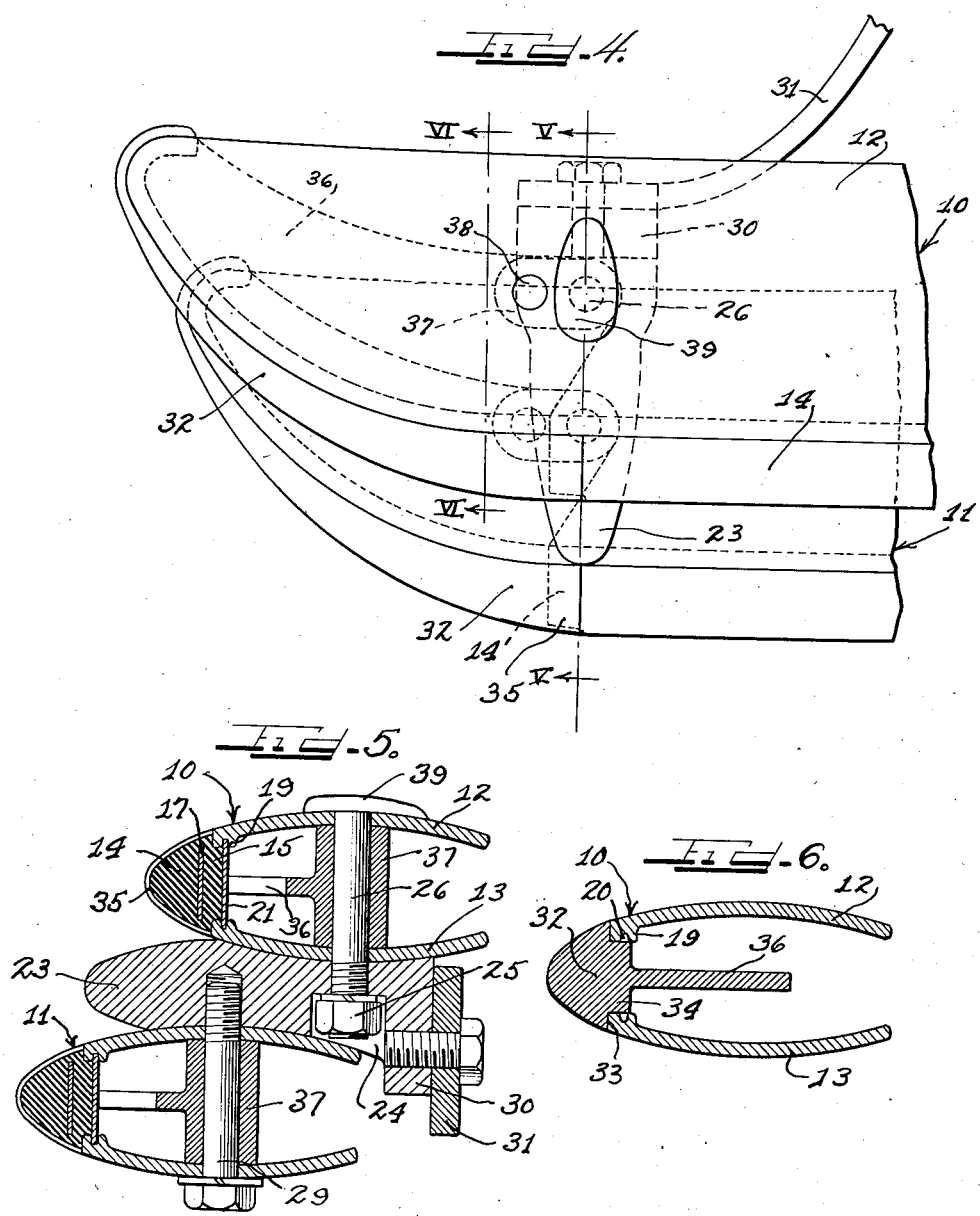

Patented Dec. 1, 1936

2,062,315

UNITED STATES PATENT OFFICE 2,062,315

VEHICLE BUMPER CONSTRUCTION

Herbert S. Jandus and Bladen M. Short, Detroit, Mich., assignors to General Spring Bumper Corporation, Detroit, Mich., a corporation of Michigan Application June 11, 1934, Serial No. 729,948

16 Claims. (Cl. 293—55)

This invention relates to improvements in vehicle bumpers and a method of making the same, the invention relating more particularly to bumpers of the character commonly used on automotive vehicles, either at the front or the rear, although the invention may have other uses and purposes as will be apparent to one skilled in the art.

In the automotive vehicle industry, very material and effective advances are being made in the provision of more speed and more power to a vehicle, and in consistency with this trend, streamlining is now an essential to the style of vehicles. This streamlining must not be limited to a portion of the vehicle or a part of the body thereof, but in most cases must take in the entire body as well as the accessory parts carried by the body. It is desirable to carry this streamlining into the bumpers of the vehicle. These bumpers must also be capable of withstanding considerable shock as a protection to the vehicle, not only withstanding the shock but also absorbing a material amount of the shock so that the full force of impact is not transmitted directly to the frame of the vehicle.

Accordingly, it is an object of the present invention to provide a vehicle bumper with a shock absorbing bumper construction including a plurality of bumper bars arranged in staggered relationship, one projecting forwardly beyond the other, to give a streamlined appearance.

Another object of this invention is the provision of a bumper construction including a plurality of spaced streamlined bumper bars with streamlined spacing means secured between the bars to hold them in fixed relative position.

Also an object of this invention is the provision of a bumper construction including a plurality of bumper bars held in spaced relationship and provided with resilient spacing members, said bumper bars also being provided with bumper guards such as clamps or brackets, and the construction being such that all parts may be finished in appearance and the guards attached contemporaneously with the assembling of the parts of the bumper.

Another object of this invention is to provide a composite bumper construction including a plurality of bumper bars, each bumper bar comprising a pair of impact plates clamped over a resilient facing member, suitable spacing means being disposed between the bumper bars, these spacing means forming a part of the means for clamping each pair of impact bars over the respective facing member.

It is also a feature of this invention to provide new and novel means for supporting a resilient facing member between a pair of impact bars to form a composite bumper bar.

Still a further object of this invention is the provision of a bumper bar construction including a pair of spaced members clamped over a resilient facing member, suitable filling means being provided between the spaced members at each end of the facing member.

A further object of the invention is the provision of a bumper bar construction including a pair of impact bars having a facing member disposed between the forward ends thereof, the facing member projecting forwardly beyond the impact bars, and metallic filling means disposed between the impact bars at the end of the facing member, the entire structure being so shaped and associated as to give a streamlined appearance.

An additional object of this invention is the provision of a new and novel method of making a bumper or bumper construction.

In many respects the present invention is similar to that shown, described and claimed in our co-pending application entitled "Vehicle bumpers and method of making the same", filed February 23, 1934, Serial No. 712,470, although the present invention discloses a dual construction, and embodies new features of construction and arrangement not disclosed in said co-pending application. At the same time, this invention is capable of performing substantially all of the objects of the invention disclosed in the aforesaid co-pending application.

While some of the more salient features and characteristics of this invention have been above pointed out, others will become apparent from the following disclosures.

The invention includes these and other features of construction, combinations of parts, and method of making, hereinafter described, and shown in a preferred form in the drawings, and more particularly indicated by the claims.

On the drawings:

Figure 1 is a top plan view of a vehicle bumper embodying principles of this invention, showing the same connected with cushion bar mountings.

Figure 2 is a front elevational view of the structure shown in Figure 1.

Figure 3 is an enlarged transverse vertical sectional view taken substantially as indicated by the line III—III of Figure 1.

Figure 4 is an enlarged fragmentary top plan view illustrating the end construction of the bumper.

Figure 5 is a transverse vertical sectional view taken substantially as indicated by the line V—V of Figure 4.

Figure 6 is also a vertical sectional view through the upper bar only of the bumper taken substantially as indicated by the line VI—VI of Figure 4.

As shown on the drawings:

In the illustrated embodiment of the present invention, there is shown a composite bumper construction including a pair of fabricated spaced bumper bars, the upper being generally indicated by the reference numeral 10 and the lower generally indicated by the reference numeral 11. The fabricated bumper bars are substantially identical in construction, and are arranged in fixed spaced relationship with one of the bars, in this instance the lower bar 11, projecting outwardly beyond the other bar. Such construction not only provides a desired streamline appearance for the bumper as a whole, but also furnishes shock absorbing and receiving means upon different levels so that if the lower bar should slide under the bumper upon the other of meeting vehicles, adequate shock absorbing and receiving means would be furnished by the upper bar. The bumper construction set forth herein also eliminates to a considerable extent the tendency of bumpers upon meeting vehicles to lock together.

Since the bumper bars 10 and 11 are substantially identical in construction, it is only necessary to specifically describe one of them herein. Each of these bumper bars comprises a pair of confronting impact plates or members 12 and 13, respectively. To provide the proper bumper shape, the impact members are bent into arcuate shape along their longitudinal axes. Each of these impact members is also preferable transversely arced so as to present a convex outer face and a concave inner face. This transverse arcing of the respective members not only enhances the strength of the members without increasing the weight thereof, but also presents the desired streamline appearance, and further, furnishes material advantages in construction and assembly, as will more fully appear later herein.

A facing strip 14 is provided at the forward portion of the bumper bar in impact receiving position. This facing strip or member extends for a considerable length across the front portion of the composite bumper bar, as best seen in Figures 1 and 2. A neck portion 15 is provided upon the facing member and extends inwardly between the confronting impact members 12 and 13, the facing strip being shouldered, as at 16 (Figure 3), adjacent the neck portion, to cover the forward edges of the impact members 12 and 13. With reference to Figure 3, it will be seen that the facing member is outwardly arcuate to provide a longitudinally extending nose for the bumper bar, preferably conforming in curvature with the bars or members 12 and 13 to complete the streamline appearance of the bumper bar. Any suitable material may be used for the facing member, but this member is preferably made of rubber, rubber composition, or some other suitable resilient and shock absorbing material.

Novel means for attachment of the facing member are provided in the present instance, these means including a metallic strip 17 (Figures 3 and 5) of spring steel or the like, through which a plurality of bolts 18 extend, the strip together with the bolts being preferably molded within the facing strip during the formation of the strip.

As best seen in Figures 3, 5 and 6, each of the impact members 12 and 13 is provided at its forward end with an inwardly extending lip 19 having a groove 20 (Figure 6) formed therein, the lips and grooves of the two confronting impact members also confronting in alignment. A metallic backing member 21, slightly wider than the neck portion 15 of the facing member, is received in the confronting grooves 20, and the impact plates 12 and 13 are clamped down upon this backing member in a manner later described.

With the present conception, the facing member 14 may be secured in position in either of two ways, both ways being exemplified in the showing in Figure 3. One of these ways consists in attaching the facing member to the backing member 21 by the now known method of vulcanizing rubber to steel. Then, with the shank of the bolt 18 projecting through the backing member, a nut 22 is used to compress the rear portion of the facing member 14 and cause the shoulder 16 to bulge outwardly sufficiently to form an exact meeting line with the forward edges of the impact members 12 and 13.

However, it is not necessary to vulcanize the facing member to the backing member, if it is not desired to do so. The backing member may be placed in position between the confronting impact plates 12 and 13, and the neck of the facing members disposed between the forward edges of these plates. Then, the facing member may be securely held to the backing member by means of the series of bolts 18 and respective nuts 22, the compression so provided being such as to insure a smooth streamline exterior on the bumper bar.

At suitable intervals a spacing element 23 is disposed between the bumper bars 10 and 11, this element being preferably bullet-like in general contour to conform with the streamline appearance of the resultant bumper and is also preferably provided with an upper concave surface for the reception of the bumper bar 10 and a lower concave surface for the reception of the bumper bar 11. These concave surfaces are so disposed that one bumper bar will project forwardly or outwardly beyond the other bumper bar, and the nose of the spacing element 23 will project outwardly to a point substantially midway between the noses of the two bumper bars.

Each spacing member 23 performs its part in serving to clamp the confronting members 12 and 13 of each bumper bar over the respective facing member. Near the rear portion thereof (Figure 3), each spacing element is hollowed, as at 24, to provide a cavity for the accommodation of a nut 25 associated with a bolt 26 extending through the remaining portion of the spacing element and through both impact members 12 and 13 of the upper bumper bar 10. The tightening of the nut 25 upon the bolt 26 causes the confronting impact members 12 and 13 to clamp over the neck portion of the facing member 14, a sleeve 27 disposed around the bolt between the members 12 and 13 serving to limit the clamping movement and hold the parts in proper position.

The bolt 26 may also be utilized to hold in position a bumper guard such as the bracket or clamp 28 formed in a winged streamline shape with a hollow interior accommodating the head of the bolt 26. Of course, the underside of this guard is shaped to intimately contact with the upper surface of the impact member 12.

In the forward portion thereof, the spacing element 23 is provided with a threaded bore for the reception of the threaded end of a bolt 29 passing through the confronting impact members of the lower bumper bar 11, and the head of this bolt 29 may also be used to hold in position a lower guard 28, all substantially in the manner and for the same purposes as above described in connection with the upper bumper bar.

With reference to Figures 3 and 5, it will be noted that on each spacing element 23 there is a depending portion 30 at the inner end thereof to afford a base for the attachment thereto of an end of a cushion bar 31 for mounting the bumper upon a vehicle. At this point, it should be understood that the present composite bumper is not limited in its mounting to the use of cushion bars of the type illustrated, but might equally as well be mounted with the well known coiled spring and plunger type of mounting, or, in fact, with substantially any desired mounting.

In view of the fact that the facing members 14 do not extend the full length of the bumper bars 10 and 11, it is desirable to fill the end spaces between the confronting impact members 12 and 13 of each of these bumper bars. To this end, end fillers 32 are provided, these fillers being preferably of metal and having a forward nose portion shaped in conformity with the facing members 14, with the exception that this nose portion tapers from a width equal to that of the facing member to a portion of much less width immediately adjacent the end of the bumper bar, thus enhancing the streamline appearance of the composite whole.

The fillers 32 are identical for each bumper bar 10 and 11, and in each instance the filler is shouldered, as at 33 (Figure 6), to cover the forward edges of the impact bars 12 and 13, and the filler is also provided with a neck portion 34 extending between the ends of these members. Adjacent the junction between a filler 32 and the corresponding facing member 14, the latter is reduced in size and the former is provided with a relatively thin lip portion 35 to overlie the reduced end of the facing member, to both retain the end of the facing member securely in position and to insure the symmetrical appearance of the respective bumper bar.

Each of the fillers 32 is provided in the rear portion with a preferably integral web 36 which terminates at an inner corner in a double sleeve 37. One portion of this sleeve 37 corresponds to the sleeve 27 mentioned above, and like the sleeve 27 is disposed between the impact members 12 and 13 around a bolt 26 (Figures 4 and 5). The other portion of the double sleeve 37 (Figure 4) is also apertured for the reception of a pin 38 engaged with the impact members 12 and 13 in the style of a rivet or in any other suitable manner. With the double sleeve and the pin 38 so engaged, the respective filler 32 is prevented from pivoting or moving relatively to the other parts of the bumper bar.

Also with reference to Figures 4 and 5, it will be seen that in this instance the bolt 26 need not support a guard 28, since this bolt is disposed adjacent the end of the bumper bar. Accordingly, this bolt is provided with a streamlined head 39 to enhance the appearance of the resultant composite bumper.

The bumper bar 11 also carries a similar filler 32 having a double sleeve 37 functioning as above described. In this instance, a bolt 29 is used through the sleeve engaging in the spacing member 23 identically as above set forth.

Of course, the opposite ends of both bumper bars are also provided with fillers 32 in the same manner. It will also be understood that facing members of the character set forth in our aforesaid co-pending application may also equally as well be used with the present invention.

The bumper construction herein set forth lends itself to a new and novel method of making, or more particularly, a method of assembly of the respective parts of the bumper. Each and every part of the composite bumper may be finished completely, including all of the impact members 12 and 13, the facing members, the spacing members 23, the guards 28, and even the various bolt and nut connections. These parts may then be readily assembled and the guards attached at the same time the impact members 12 and 13 are clamped upon the respective facing members. In other words, all of the component parts of the complete composite bumper may be substantially simultaneously assembled resulting in a finished bumper ready for mounting.

From the foregoing, it will be apparent that we have designed a composite bumper construction simple to form and assemble, and which is exceedingly strong, light in weight, and very attractive in its streamlined appearance. The composite bumper is capable of withstanding as well as absorbing relatively great impacts with no injury to the bumper or to the vehicle to which it is attached. Furthermore, the bumper incorporates novel features of construction, a novel method of making the same, and may be economically manufactured.

We are aware that many changes may be made and numerous details of construction may be varied through a wide range without departing from the principles of this invention and we, therefore, do not purpose limiting the patent granted hereon otherwise than necessitated by the prior art.

We claim as our invention:

1. In a vehicle bumper, a bumper bar including a pair of members with a facing member clamped therebetween, another and similar bumper bar spaced from the first said bumper bar, and spacing means between said bumper bars and secured thereto to maintain said bars in fixed relative position.

2. In a vehicle bumper, a pair of spaced bumper bars, each of said bumper bars including a pair of members with a facing member disposed therebetween, and means for clamping each pair of said members upon the respective facing member, said means including a spacing member between said bumper bars.

3. In a vehicle bumper, an upper bumper bar, a lower bumper bar, each of said bumper bars including a pair of impact members with a facing member therebetween, means for clamping each pair of impact members on the respective facing member and spacing means disposed between said bumper bars and engaged with each of the first said means to aid in said clamping of said facing members.

4. In a vehicle bumper, an upper bumper bar, a lower bumper bar, spacing means between said bars, guards on said bars, and means engaging said guards and said spacing means to hold said guards on said bars and maintain said bars in fixed relative position.

5. In a vehicle bumper, a bumper bar including a pair of confronting members with a facing element therebetween, a second and similar bumper bar, a spacing member between said bumper bars and shaped for intimate contact by each of said bars, and securing means passing through each of said bars and engaged with said spacing member to clamp each pair of said confronting members on the respective facing element and maintain said bumper bars in fixed relative position.

6. In a vehicle bumper a pair of confronting members, backing means clamped between the outer portions of said members, and a facing element extending between the outer portions of said members and bolted to said backing means to hold said element in position and compress a portion of said element to expand the same to overlie the outer edges of said members.

7. In a vehicle bumper, a pair of confronting members, a backing member clamped between the outer margins of said members, a rubber facing element vulcanized to said backing member, and means associated with said facing element and said backing member and operable to compress a portion of said facing element to transversely extend the same to evenly cover the outer edges of said confronting members.

8. In a vehicle bumper, a pair of confronting members, resilient facing means clamped between said members, and filler means disposed between said members to occupy the space not occupied by said facing means.

9. In a vehicle bumper, a pair of confronting members, a resilient facing element clamped between the outer margins of said members, said facing element being shorter than said members, and filling means disposed between said members at the ends of said facing element.

10. In a streamlined vehicle bumper, a pair of transversely arcuate confronting members, a resilient facing element clamped between said members, said facing element being outwardly arcuate in keeping with the curvature of said members, said facing element being shorter than said members, and a relatively rigid filler shaped in conformity with said members and said facing element and disposed between said members adjacent each end of said facing element.

11. In a vehicle bumper, a pair of spaced bumper bars, each of said bars including a pair of members with a cushion facing member disposed therebetween, and means comprising a spacing member between the bars and clamping each pair of said members upon the respective facing member.

12. Bumper construction comprising spaced substantially parallel elongated impact bars, spacing means disposed between said bars, elongated cushioning means bounded by said bars and spacing means and projecting in advance of said bars, and clamping means independent of said cushioning means and cooperating with said bars to hold said cushioning means in assembled relation to said bars and spacing means.

13. Bumper construction comprising spaced elongated impact bars, cushioning means disposed between and projecting in advance of said bars, relatively rigid spacing means between said bars, said spacing means also projecting in advance of said bars and providing with said cushioning means a substantially continuous impact surface, and means for securing the parts together in assembled relation.

14. In a vehicle bumper, an upper arcuate bumper bar having a front impact cushion, a lower arcuate bumper bar spaced from said cushion, and a spacing member secured between said bumper bars and clear of said cushion and having a recess on each side thereof shaped to intimately receive one of said bumper bars.

15. In a vehicle bumper, an upper bumper bar, a lower bumper bar, spacing means between said bars, guard means for said bars, said guard means including a part extending above the upper bar and a part extending below the lower bar, and means engaging said guard means and spacing means to hold said guard means and bars in fixed relative positions.

16. In a vehicle bumper, an upper bumper bar, a lower bumper bar, spacing means between said bars, guard means for said bars, said guard means including a part extending above the upper bar and a part extending below the lower bar, and means shielded by said guard means and engaging said guard means and spacing means to hold said guard means and bars in fixed relative positions.

HERBERT S. JANDUS.
BLADEN M. SHORT.